July 29, 1952     H. T. PYK ET AL     2,605,141
FUEL INJECTION APPARATUS
Filed Oct. 29, 1946     2 SHEETS—SHEET 1
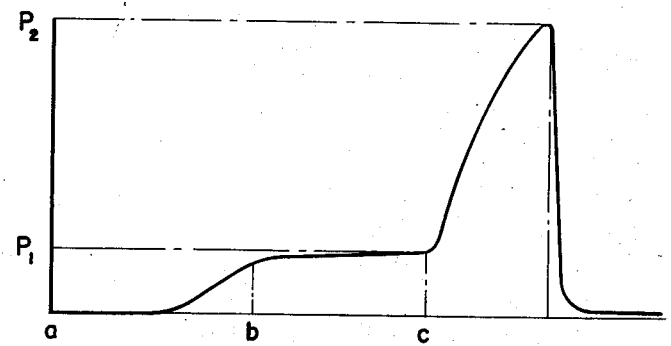
FIG. 1
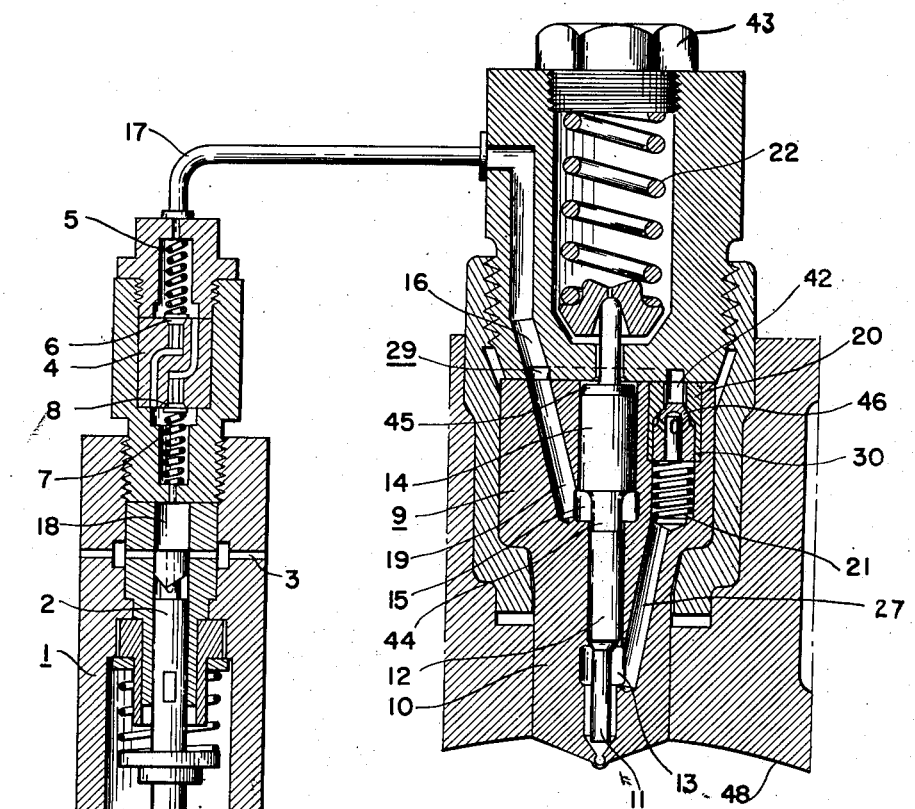
FIG. 2
*INVENTOR.*
HERMAN THEODOR PYK,
BY HILMER GUNNAR CAMNER
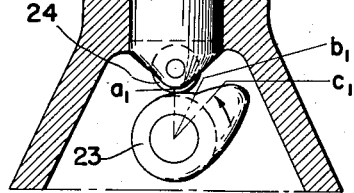
ATTORNEY

INVENTOR.
HERMAN THEODORE PYK
HILMER GUNNAR CAMNER
BY
ATTORNEY

Patented July 29, 1952

2,605,141

UNITED STATES PATENT OFFICE 2,605,141

FUEL INJECTION APPARATUS

Herman Theodor Pyk, Saltsjo-Duvnas, and Hilding Gunnar Camner, Storangen, Sweden, assignors to Aktiebolaget Atlas Diesel, Sickla, near Stockholm, Sweden, a corporation of Sweden Application October 29, 1946, Serial No. 706,308

7 Claims. (Cl. 299—107.2)

Our present invention relates to cam driven fuel injection apparatus and, particularly, to apparatus of this kind as used in connection with internal combustion engines.

Diesel engines, especially high speed diesel engines with solid injection, generally operate in a rough and uneven manner when the ordinary injection devices are used, owing to the fact that ignition takes place more or less explosively. This rough running is a great disadvantage, because it not only imposes extra mechanical strains on the engine but also causes considerable and disturbing noise.

In order to improve this rough running, attempts have been made to divide the fuel injection into two entirely separate phases, namely a preliminary and a main injection, respectively, with an interval between the two. The disadvantage of this arrangement is, however, that after the first injection a certain amount of dripping occurs just as the fuel valve is in the act of closing, which results in smoky exhaust gases and a poor fuel economy.

One object of our invention is to provide improved means for avoiding these and other disadvantages by effecting one continuous fuel injection in two stages without interruption between the stages and so that in the first stage a preferably substantially constant and relatively low injection pressure is maintained while in the latter stage the pressure is increased to its maximum value. This rise of the pressure in the second stage, which represents the main injection, may be very rapid. This injection method results in a smooth and silent engine operation without dripping, and hence the deleterious results above referred to are avoided. For these and other purposes we provide a fuel injection apparatus comprising a pump producing a rise of the fuel pressure to a moderate value, combined with an injection valve opening at said moderate pressure, which is maintained at such a value as to keep said valve open during the initial stage of the injection period, said pump producing then a further rise of the fuel pressure to a high value following upon said moderate pressure for effecting the second stage of the injection period. The injection valve is designed so that, in conjunction with the pump, it not only produces the above described type of injection, but further it maintains, during periods between the injection periods, a fuel pressure at the injection valve which is greater than the maximum pressure in the engine cylinder, thus preventing any possibility of combustion gases flowing back past the valve which, if permitted, would cause deposits of carbon thereon.

Two embodiments of fuel injection devices according to the invention are illustrated by way of examples in the accompanying drawings, it being understood, however, that various modifications and other combinations of the illustrated elements may be made within the scope of the appended claims.

Fig. 1 shows graphically the fuel pressure variations during the two injection stages;

Fig. 2 is a cross-sectional view of a fuel pump and injection valve combination in accordance with the present invention;

Figures 3, 4:
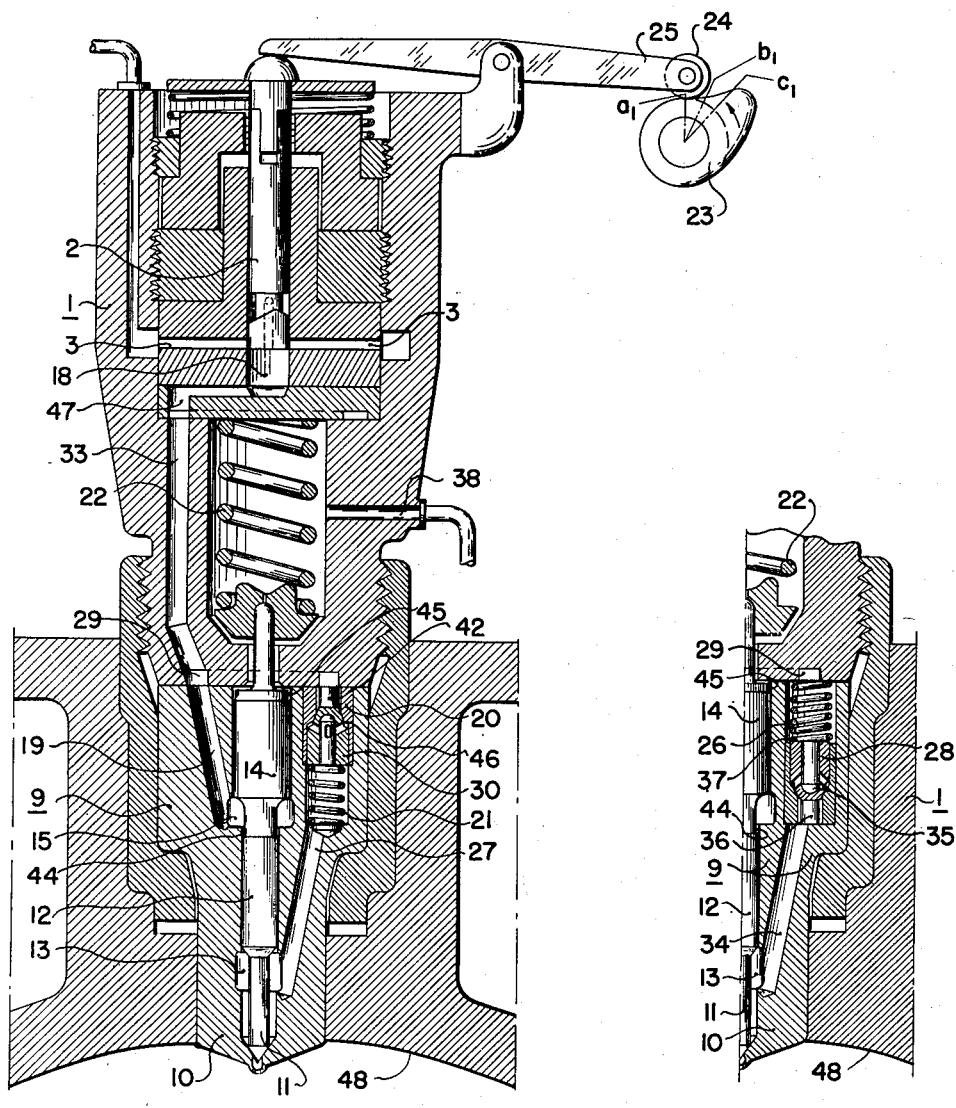
Fig. 3 is a cross-sectional view of a fuel pump and injection valve combination built as a single unit.
Fig. 4 is a cross-sectional view, taken at right angles to the planes of Figs. 2 and 3, showing a modification of the injection valve shown in either Figs. 2 or 3.

In the diagram shown in Fig. 1 the ordinate indicates the fuel pressure and the abscissa the time. Fuel injection begins when a suitable pressure has been built up in the fuel pump. This point is indicated by $a$ and the fuel injection then continues at a preferably substantially constant and moderate fuel pressure $p_1$ during the time interval between the points $a$ and $b$. After the interval $a$—$b$ the fuel injection continues with increasing pressure during an interval $b$—$c$ until the maximum value $p_2$ is reached, the pressure is then wholly or partly relieved when the delivery pressure of the fuel pump drops. The fuel injection thus proceeds in one period uninterruptedly during the time interval $a$—$c$ comprising a first stage $a$—$b$ of relatively low and preferably substantially constant pressure and a second stage $b$—$c$ at a pressure increasing up to the maximum value and representing the main injection.

The quantity of fuel injected during the first stage should be as small as possible but should, however, be distributed over a certain period enabling ignition to take place before the second stage of the injection has commenced or immediately thereafter.

In the embodiments of the invention illustrated in Figs. 2 and 3 the fuel pump 1 consists of a pump casing and a pump plunger 2 operating therein. The pressure chamber 18 of the pump communicates with a combustion chamber 48, such as the cylinder of an internal combustion engine, through a fuel injection valve device generally indicated by the numeral 9 in a manner which will be described in detail hereinbelow. The pressure chamber 18 also communicates with a source of fuel (not illustrated), which may be kept under pressure, through passages 3.

The pump plunger 2 is actuated by a cam 23 driven in timed relation to the engine crankshaft and cooperating with a cam follower roller 24. In the embodiment according to Fig. 2 the motion of the follower is transmitted directly to the pump plunger 2 and in the embodiment according to Fig. 3 through a rocker arm 25.

In the illustrated embodiments the fuel injection valve device comprises an atomizer 10 and a spring-loaded fuel injection valve 11 controlling the communication between the delivery end of the fuel pump and the combustion chamber 48. The injection valve 11 is formed at the end of a piston member 12 of a comparatively small diameter lapped in a cylindrical guide 44 ending in a lower chamber 13 connected with the pressure chamber 18 of the fuel pump.

In the embodiment according to Fig. 2 the fuel pump is provided with a head 4 in which a non-return pressure valve 6 loaded by a spring 5 is disposed. The tension of said spring may be adjusted so that the valve 6 opens at a higher fuel pressure than the injection valve 11. The head 4 contains a further non-return valve 8 opening in the opposite direction to the valve 6 and loaded by a spring 7. The valve 8 preferably opens at a pressure slightly above the maximum pressure in the combustion chamber 48 but lower than the pressure against which the injection valve 11 is designed to close. The pressure chamber 18 of the fuel pump communicates with the chamber 13 in the fuel injection valve device 9 through a conduit 17, a passage 16, an annular duct 29, a passage 42, a valve 30 and a duct 27. The valve 30 is displaceable and seated in a socket 20 and loaded by a weak spring 21 and opens towards the passage 27. The valve 30 has a piston-shaped pressure reducing portion 46 cooperating with a corresponding cylindrical bore in the socket 20. The pressure chamber 18 of the fuel pump also communicates through a passage 19 with an upper chamber 15 in the valve device 9. A piston member 14 of larger diameter than piston 12 is made integral with the piston member 12 and the injection valve 11 and lapped in a cylindrical guide 45. The whole injection valve unit 11, 12, 14 is loaded by a spring 22 tending to close the injection valve. The tension of the spring 22 may be adjusted by means of the screw 43.

The fuel injection apparatus according to Fig. 2 operates in the following manner:

During the rotation of the cam 23 in the direction of the arrow injection begins approximately when the point $a_1$ of the cam 23 presses against the roller 24 of the pump, the pump plunger 2 then covering the passages 3. The ramp portion $a_1$—$b_1$ of the cam curve is designed to have a slight rise which is so adapted that the pressure during this injection stage is kept substantially constant at a moderate value. During this injection stage fuel is delivered from the pressure chamber 18 past the valve 6 through the conduit 17, the passage 16, the duct 29 and the passage 19 to the chamber 15, and, furthermore, through the passage 42, past the valve 30 through the passage 27 to the lower chamber 13. The moderate fuel pressure in the chambers 13 and 15 acting on the piston members 12 and 14 is sufficient to overcome the pressure of the spring 22 so that the injection valve 11 is opened and fuel is injected into the combustion chamber 48 at said moderate pressure through the nozzles of the atomizer 10. The following and contiguous ramp portion $b_1$—$c_1$ of the curve of the cam 23 is designed to have a sharper rise so that the movement of the plunger 2 becomes more rapid, the result being that the fuel pressure rises owing to the resistance in the nozzles of the atomizer 10, and the main injection stage occurs at an increased pressure substantially according to the curve $b$—$c$ indicated in Fig. 1. At the point $c_1$ of the cam 23 the pressure in the pressure chamber 18 is relieved and consequently also the pressure in the chamber 15 acting on the larger piston 14 of the valve device 9. The load of the spring 22 is then sufficient to overcome the high pressure prevailing on the smaller piston member 12 so that the injection valve 11 is immediately closed and surplus fuel in the chamber 13, the passages 27, 42, 19, 29 and the conduit 17 is forced back past the valve 8 to the pump. However, the tension of the spring 7 controls the pressure in the chamber 13 and the passages communicating therewith so that it does not fall below the maximum combustion pressure of the engine cylinder and consequently the combustion gases cannot enter the nozzles of the atomizer 10. Furthermore, when return-flow of fuel from the chamber 13 and the passage 27 occurs the piston-shaped portion 46 of the valve 30 soon enters the bore in the socket 20 so that further return-flow is prevented. A suitable reduction of the pressure in the chamber 13 and the passage 27 is, however, always obtained due to the pressure reducing action of the portion 46 before the valve 30 is seated.

In some engines either the valve 30 or the valves 6 and 8 may be dispensed with. In the former case, however, the passage 19 should be connected to the delivery end of the fuel pump before the valves 6 and 8 instead of being connected to the duct 29.

In the embodiment according to Fig. 3 the fuel pump 1 and the fuel injection valve device 9 form a unit injector, which has the advantage that the conduits or passages between the fuel pump and the injection valve are very much reduced in length. The parts of the unit injector illustrated in Fig. 3 which correspond to similar parts in the embodiment according to Fig. 2 have been indicated by the same reference numerals and are not described in detail.

The pressure chamber 18 of the pump is in this case connected with the lower chamber 13 of the injection valve device 9 through a duct 47, a passage 33 and an annular duct 29 in the composite pump casing 1, a passage 42, a non-return pressure reduction valve 30 provided with a suitable cylindrical pressure reduction portion 46, and a passage 27. A passage 19 forms a direct communication between the pressure chamber 18 and the upper chamber 15 in the valve device 9. The injection valve unit 11, 12, 14 is of the same design as in Fig. 2. A passage 38 serves to drain leaking fuel from the space containing the spring 22.

The operation of the fuel injection apparatus according to Fig. 3 is similar to the operation of the apparatus according to Fig. 2, the only difference being caused by the absence of the valves 6 and 8. Thus, fuel injection starts at the moment when the point $a_1$ on the cam 23 reaches the roller 24 and a moderate fuel pressure then acts on the members 12 and 14 against the pressure of the spring 22, the valve 30 being opened and the injection valve 11 being lifted from its seat so that fuel is injected at said moderate pressure through the nozzles of the atomizer 10. When the point $b_1$ of the cam 23 reaches the roller 24 the fuel pressure in the pressure chamber 18 rises due to the increased pump plunger velocity and the increased resistance in the nozzles of the atomizer and the main injection stage occurs between the points $b_1$ and $c_1$. At the point $c_1$ the pressure in the pressure chamber 18 is relieved which immediately causes a pressure drop in the duct 47, the passage 33, the duct 29, the passage 19 and the chamber 15. The spring 22 is then capable of closing the injection valve 11 against the pressure prevailing in the chamber 13 which is simultaneously reduced somewhat due to the return movement of the pressure reduction portion 46 on the valve 30, which before the valve is seated increases the volume of the space on the injection valve side of the valve 30. However, this should not decrease the pressure in space 13 to a value less than the maximum engine cylinder pressure.

Fig. 4 illustrates a modification of the embodiment according to Fig. 2 and is a section in a plane perpendicular to the section of Fig. 2. In this case a further passage 26 containing a valve 28 and communicating with a passage 34 leading to the chamber 13 is provided in the valve device 9. The valve 28 which may have a piston-shaped pressure reducing portion 35 is disposed in a socket 36 and loaded by a spring 37. The spring-load on the valve 28 is, similarly to the spring-load on the valve 8 in Fig. 2, so dimensioned that the valve 28 is opened only at pressures equal to or above the maximum combustion pressure.

The embodiment according to Fig. 2 modified according to Fig. 4 may preferably be used when the valves 6 and 8 are dispensed with since in the modified embodiment the valves 30 and 28 may perform the functions of the valves 6 and 8 according to Fig. 2, but in the case when both the valves 6 and 8 and 30, 28 are used a double safeguard is obtained against pressure waves reaching the injection valve after its closure.

In all described embodiments the valves 30 and/or 28 may sometimes be carried out without the pressure reducing portions 46 and 35, respectively. The passages and valve 28 according to Fig. 4 may also be used in connection with Fig. 3.

It should be understood that the invention is not restricted to the embodiments above described and illustrated in the drawings and different modifications and combinations of the elements may be made within the scope of the claims. For instance, the pump may be differently designed, and the pressure relief achieved by means of the illustrated form of pump plunger may be achieved by other pressure relieving means common in the art.

What we claim is:

1. In a fuel injection system for injecting fuel to a combustion chamber, a plunger pump having a pressure releasing cut-off for determining the end of the effective discharge stroke of the plunger and cam means comprising two contiguous ramp portions having different rates of rise for causing delivery of fuel from the pump initially at relatively slow rate followed without interruption by delivery at higher rate, whereby to supply fuel first at relatively moderate pressure for preinjection and thereafter at high pressure for main injection, and a fuel injection valve device supplied by said pump and having nozzle means for injecting fuel from said pump into the combustion chamber, said device including an injection valve for controlling said nozzle means and having a spring load for closing the valve, a first pressure responsive means and a second pressure responsive means to which fuel under pressure from said pump is admitted, said pressure responsive means together being operative to overcome said spring load and open said valve under the influence of said moderate pressure and to maintain the valve open under the influence of the following high pressure, and means for releasing the pressure acting on one of said pressure responsive means while maintaining high pressure on the other of said pressure responsive means when pump pressure is released by said pump cut-off, said spring load being sufficient to close said valve against the high pressure maintained on said other pressure responsive means.

2. A system as set forth in claim 1 in which said injection valve comprises two piston portions of different area each in communication with a different pressure chamber, and said valve device includes passages for separately supplying fuel to said chambers.

3. A system as set forth in claim 2 in which pressure is released by the pump cut-off from the piston portion of larger area.

4. A system as set forth in claim 3 in which said valve device includes a second valve located in the passage leading to the chamber with which the piston portion of smaller area communicates, said valve being operative to maintain pressure in the last mentioned chamber after pump pressure has been released by said cut-off.

5. A fuel injection valve comprising a valve housing a portion of which forms a fuel injection nozzle, a fuel injection opening in said nozzle, a fuel supply passage in said housing leading to said opening, a one-piece portion of the housing having at least one bore with large diameter and one bore with small diameter, a main valve member controlling the opening and movable in the housing and having at least one plunger type guiding portion with large diameter forming a fluid tight seal in said large bore and one plunger type guiding portion with small diameter forming a fluid tight seal in said small bore, and an auxiliary non-return valve in the housing disposed in said passage leading to the nozzle opening.

6. A fuel injection valve comprising a valve housing a portion of which forms a fuel injection nozzle, a fuel injection opening in said nozzle, a fuel supply passage in said housing leading to said opening, a one-piece portion of the housing having at least one bore with large diameter and one bore with small diameter, a main valve member controlling the opening and movable in the housing and having at least one plunger type guiding portion with large diameter forming a fluid tight seal in said large bore and one plunger type guiding portion with small diameter forming a fluid tight seal in said small bore, and an auxiliary valve in said one-piece portion of the housing disposed in said passage leading to the nozzle opening.

7. A fuel injection valve comprising a valve housing a portion of which forms a fuel injection nozzle, a fuel injection opening in said nozzle, a fuel passage in said housing leading to said opening, a one-piece portion of the housing having at least one bore with large diameter and one bore with small diameter, a spring loaded main valve member controlling the opening and having at least one-plunger type guiding portion with large diameter forming a fluid tight seal in said large bore and one-plunger type guiding portion with small diameter forming a fluid tight seal in said small bore and movable in the housing against said spring load upon fuel pressure actuation of said large and small plunger type portions, a space in the housing communicating with said fuel passage and exposing the large plunger type portion to fuel pressure, a further space in the housing communicating with the fuel passage and exposing the small plunger type portion to fuel pressure, and an auxiliary non-return valve in said one-piece portion of the housing disposed in the fuel passage leading to the nozzle opening between said spaces.

HERMAN THEODOR PYK.
HILDING GUNNAR CAMNER.

REFERENCES CITED

The following references are of record in the file of this patent:

UNITED STATES PATENTS

| Number | Name | Date |
|---|---|---|
| 1,834,061 | Joachim | Dec. 1, 1931 |
| 1,907,696 | Woolson | May 9, 1933 |
| 2,012,086 | Mock | Aug. 20, 1935 |
| 2,090,781 | Camner | Aug. 24, 1937 |
| 2,223,755 | Dillstrom | Dec. 3, 1940 |
| 2,306,364 | Skaredoff | Dec. 22, 1942 |
| 2,380,148 | Camner | July 10, 1945 |

FOREIGN PATENTS

| Number | Country | Date |
|---|---|---|
| 248,212 | Italy | May 11, 1926 |